(12) United States Patent  
Lafargue et al.

(10) Patent No.: US 11,988,097 B2  
(45) Date of Patent: May 21, 2024

(54) AIRCRAFT POWER ARCHITECTURE

(71) Applicant: SAFRAN HELICOPTER ENGINES, Bordes (FR)

(72) Inventors: Olivier Lafargue, Moissy-Cramayel (FR); Thomas Klonowski, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 855 days.

(21) Appl. No.: 17/056,292

(22) PCT Filed: May 9, 2019

(86) PCT No.: PCT/FR2019/051051  
§ 371 (c)(1),  
(2) Date: Nov. 17, 2020

(87) PCT Pub. No.: WO2019/220038  
PCT Pub. Date: Nov. 21, 2019

(65) Prior Publication Data  
US 2021/0362869 A1 Nov. 25, 2021

(30) Foreign Application Priority Data  
May 18, 2018 (FR) ..................... 1854151

(51) Int. Cl.  
*F01D 15/10* (2006.01)  
*B64C 27/12* (2006.01)  
(Continued)

(52) U.S. Cl.  
CPC ............. *F01D 15/10* (2013.01); *B64C 27/12* (2013.01); *F02C 7/32* (2013.01); *F02C 7/36* (2013.01);  
(Continued)

(58) Field of Classification Search  
CPC ....................................... F02C 7/32  
See application file for complete search history.

(56) References Cited

U.S. PATENT DOCUMENTS

| 4,159,623 A * | 7/1979 | McReynolds | F02C 6/20 |
| | | | 60/39.15 |
| 8,201,414 B2 * | 6/2012 | Haehner | F01D 15/10 |
| | | | 60/788 |

(Continued)

FOREIGN PATENT DOCUMENTS

| EP | 2974964 A1 | 1/2016 |
| FR | 2914697 A1 | 10/2008 |

(Continued)

OTHER PUBLICATIONS

G M Raimondi, T Sawata, M Holme, A Barton, G White, J Coles, P H Mello and N Sidell, "Aircraft Embedded Generation Systems," Power Electronics. Machines and Drives, Apr. 16-18, 2002, Conference Publication No. 487.0 IEE 2002 (Year: 2002).*

(Continued)

*Primary Examiner* — David P. Olynick  
(74) *Attorney, Agent, or Firm* — WOMBLE BOND DICKINSON (US) LLP

(57) ABSTRACT

The invention relates to an aircraft power architecture comprising a power transmission gearbox (12), located in a first compartment (30), a gas turbine (14), located in a second compartment (32) comprising a gas generator (18) and a free turbine (22) connected to the power transmission gearbox (12) by a power shaft (26) of the gas turbine (14), and an accessory gearbox (16), the gas turbine (14) being set into the main transmission gearbox (12), characterized in that the gas turbine (14) comprises a first electric machine (38), and in that the accessory gearbox (16) is placed in the first compartment (30) and comprises a second electric machine (Continued)

Figure 1:
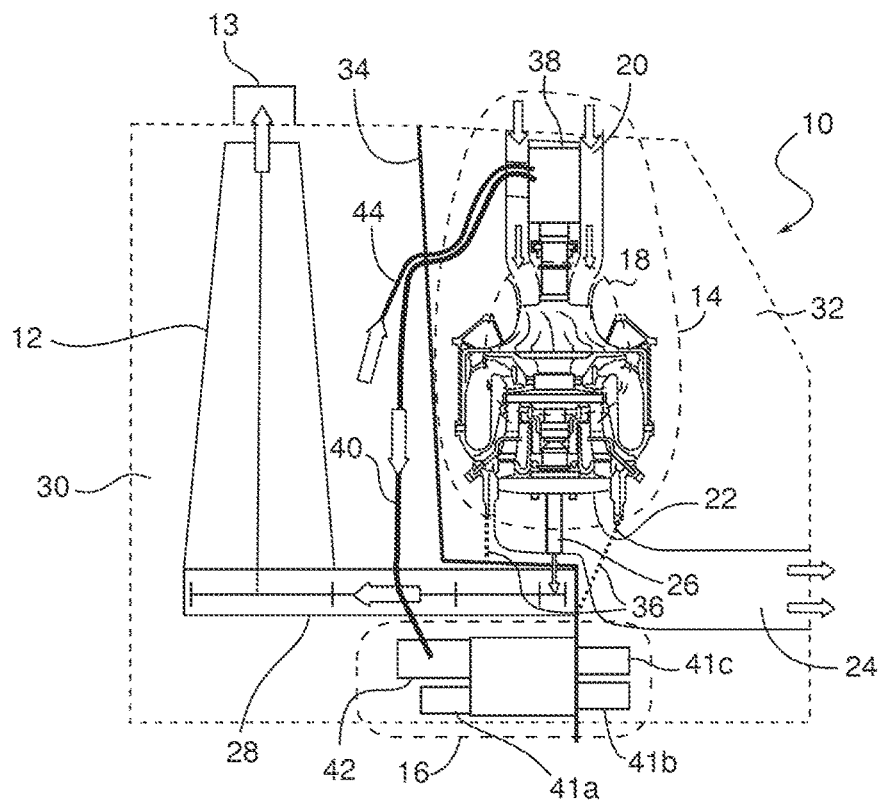

(42) configured to supply energy to the accessory equipment and to receive electrical energy transmitted via the first electric machine (38).

11 Claims, 2 Drawing Sheets

(51) Int. Cl.
*F02C 7/32* (2006.01)
*F02C 7/36* (2006.01)

(52) U.S. Cl.
CPC .. *F05D 2220/323* (2013.01); *F05D 2220/329* (2013.01); *F05D 2220/50* (2013.01); *F05D 2220/76* (2013.01)

(56) References Cited

U.S. PATENT DOCUMENTS

| | | | | |
|---|---|---|---|---|
| 8,757,542 | B2* | 6/2014 | Hopdjanian | B64D 27/24 244/58 |
| 9,447,734 | B2* | 9/2016 | Mariotto | F02C 7/36 |
| 9,873,518 | B2* | 1/2018 | Sautreuil | B64D 27/24 |
| 10,214,296 | B2* | 2/2019 | Mercier-Calvairac | B64C 27/04 |
| 10,301,035 | B2* | 5/2019 | Bedrine | B64C 27/04 |
| 10,759,280 | B2* | 9/2020 | Waltner | B64D 27/24 |
| 2013/0042630 | A1* | 2/2013 | Muldoon | F02C 7/32 60/796 |
| 2018/0058330 | A1* | 3/2018 | Munevar | F02K 3/06 |
| 2022/0099031 | A1* | 3/2022 | Miller | F01D 25/24 |

FOREIGN PATENT DOCUMENTS

| | | |
|---|---|---|
| FR | 2962404 A1 | 1/2012 |
| FR | 2992630 A1 | 1/2014 |
| FR | 3003514 A1 | 9/2014 |
| FR | 3019219 A1 | 10/2015 |

OTHER PUBLICATIONS

M. Simon Jarvis, Bert Smith, "The Applicability of Electrically Driven Accessories for Turboshaft Engines," Presented at the International Gas Turbine and Aeroengine Congress and Exposition Cincinnati, Ohio May 24-27, 1993 (Year: 1993).*

William D. Jones, Albion R. Fletcher, Jr. "Electric Drives on the LV100 Gas Turbine Engine," Presented at the International Gas Turbine and Aeroengine Congress and Exposition Cincinnati, Ohio May 24-27, 1993 (Year: 1993).*

R I Jones, "Considerations of the all electric (accessory) engine concept," Proc Instn Mech Engrs vol. 209, IMechE 1995. (Year: 1995).*

Integrated Accessory Systems for Small Gas Turbine Engines, USAAMRDL-TR-7S-46, Pratt A Whitney Aircraft, Jan. 1976. (Year: 1976).*

The jet engine, © Rolls-Royce plc 1986, Fifth edition, The Technical Publications Department, Rolls-Royce plc Derby England, p. 66. (Year: 1986).*

International Search Report and Written Opinion received for PCT Patent Application No. PCT/FR2019/051051, dated Sep. 19, 2019, 21 pages (11 pages of English Translation and 10 pages of Original Document).

* cited by examiner

AIRCRAFT POWER ARCHITECTURE

TECHNICAL FIELD OF THE INVENTION

The invention relates to an aircraft power architecture. In particular, the invention relates to an architecture comprising a gas turbine and a power transmission gearbox, for example a main transmission gearbox of a helicopter or another rotary wing aircraft (turboshaft engine architecture), or a transmission gearbox of a fixed wing propeller aircraft (turboprop architecture).

BACKGROUND

The prior art comprises in particular the patent applications EP-A1-2 974 964, FR-A1-3 003 514, FR-A1-3 019 219, FR-A1-2 992 630, FR-A1-2 914 697 and FR-A1-2 962 404.

The aircraft power architecture refers to the architecture allowing the production of propulsive energy from the aircraft and its transmission to the propulsion element via a power transmission gearbox, the propulsion element being for example a rotary wing or a propeller.

The power architecture comprises a gas turbine that produces this propulsive energy and transmits it to the power transmission gearbox, which uses this power to rotate the propulsion element via a rotor.

The installation of the gas turbine in the aircraft responds to a multitude of constraints, particularly in terms of space requirements and keeping the gas turbine in place in the aircraft.

Traditionally, the gas turbines are attached to at least one mechanical floor of an aircraft engine compartment, and preferably also attached to the power transmission gearbox, since the objective is to transmit the energy generated by the gas turbine to this power transmission gearbox. To manage the relative movements of the gas turbine with respect to the power transmission gearbox, the attachments are made more complex by the addition of connecting rods, universal joints, ball joints and a misalignment recovery system that increase the mass of the architecture.

To reduce the mass and limit the complexity of the attachment, it was proposed as a solution to directly set in the gas turbine to the power transmission gearbox via the power shaft of the free turbine of the gas turbine and to add holding systems between the gas turbine and the power transmission gearbox. This eliminates the need to manage misalignments between the gas turbine and the power transmission gearbox.

However, in this configuration, the gas turbine is only held in place at one end. The other end is cantilevered and excess mass can lead to high mechanical stresses in the connection with the main transmission gearbox. In particular, certain equipment linked to the gas turbine, such as oil pumps, fuel pumps, cooling unit, deaerator, alternator, etc., as well as the starter/generator of the gas turbine, or external equipment are all connected to a box known as an accessory gearbox, recovering part of the energy generated by the gas turbine. This accessory gearbox and all these equipment are fixed around the gas turbine to benefit from the energy produced, and represent an important mass in this cantilever configuration.

The inventors therefore sought a solution to these drawbacks.

OBJECTIVES OF THE INVENTION

The invention aims to overcome at least some of the drawbacks of known power architectures.

In particular, the invention aims at providing, in at least one embodiment of the invention, a power architecture allowing to reduce the cantilever mass in the configurations where the gas turbine is integral with the power transmission gearbox.

The invention also aims at providing, in at least one embodiment, a power architecture with reduced mass and complexity.

The invention also aims at providing, in at least one embodiment of the invention, a power architecture that can benefit from the assistance of an on-board network of the aircraft.

The invention also aims at providing, in at least one embodiment of the invention, a power architecture allowing to reduce the constraints applied to the accessory gearbox.

DISCLOSURE OF THE INVENTION

For this purpose, the invention concerns an aircraft power architecture, comprising:
- a power transmission gearbox, located in a first compartment, and configured to transmit mechanical energy to a rotor,
- a gas turbine, located in a second compartment separated from the first compartment by a partition, comprising a gas generator and a free turbine connected to the power transmission gearbox by a power shaft of the gas turbine,
- an accessory gearbox, configured to supply energy to accessory equipment by taking part of the energy produced by the gas generator,
- the gas turbine being attached in the aircraft via the power shaft being set in the main transmission gearbox and via a holding system connecting the gas turbine to the main transmission gearbox,
characterized in that:
- the gas turbine comprises a first electrical machine configured to take a part of the energy produced by the gas generator and convert it into electrical energy when the gas turbine is running,
- the accessory gearbox is located in the first compartment and comprises a second electrical machine configured to supply power to the accessory equipment and to receive electrical energy transmitted by the first electrical machine when the gas turbine is running.

A power architecture according to the invention therefore enables the cantilever mass of the gas turbine to be reduced by moving the accessory gearbox of the gas turbine to another location, namely to another compartment.

In order to ensure that the accessory gearbox always operates using a part of the energy generated by the gas turbine, a first electrical machine, such as a starter/generator, is installed on the gas turbine, and when the latter is in operation, the first electrical machine operates in generator mode and supplies power to the accessory gearbox.

This configuration is made possible by improving the performance of electrical equipment such as a starter/generator, in particular by reducing the mass of the electrical equipment with respect to the power produced (in the case of a generator) or consumed (in the case of an electric motor).

Moving the accessory gearbox into the first compartment has other advantages. The second compartment containing the gas turbine is considered a "hot zone" of the aircraft, because the temperatures there are high due to the operation of the gas turbine, whereas the first compartment is considered a "cold zone" because it does not contain any components that generate a lot of heat. The partition between the first compartment and the second compartment allows these temperature differences to be maintained.

For the same reasons, the first compartment is less subject to the constraints of vibration and pollution (oil clouds, for example) than the second compartment, which comprises the gas turbine.

Thus, the accessory gearbox is subject to less stress in terms of temperature, vibration and pollution, thus offering better reliability. In addition, it is closer to the axis of the rotor, which results in mass repositioning in the aircraft and reduces imbalances.

By transmitting electrical or mechanical power, the accessory gearbox can still supply energy to equipment located in the second compartment, for example, equipment required to operate the gas turbine such as oil pumps, fuel pump, cooling unit, deaerator, alternator, etc.

Advantageously and according to the invention, the gas turbine can be attached in the aircraft only via the power shaft set in the main transmission gearbox and via a holding system connecting the gas turbine to the main transmission gearbox.

Advantageously and according to the invention, the rotor supports a rotating wing or a propeller.

According to this aspect of the invention, the power architecture is intended to lift and/or propel the aircraft by means of a rotary wing or a propeller.

Advantageously and according to the invention, the first electrical machine is a starter/generator.

According to this aspect of the invention, the first electrical machine is also configured to start the gas generator when the gas turbine is switched off or on standby mode.

Advantageously and according to the invention, the second electrical machine is an electric motor.

Advantageously and according to the invention, the first electrical machine and the second electrical machine are brushless electrical machines and configured to operate at a rated speed of more than 50,000 revolutions per minute.

According to this aspect of the invention, the use of such electrical machines allows a significant reduction in the mass of the power architecture, and, in particular contributes to the reduction of the cantilever mass on the gas turbine.

Advantageously and according to the invention, the accessory equipment comprises a fuel pump and an oil pump of the gas turbine, said pumps being located in the second compartment.

According to this aspect of the invention, the accessory equipment related to the operation of the gas turbine can be located in the second compartment in the vicinity of the gas turbine, the accessory gearbox remaining in the first compartment. Other accessory equipment may also be located in the second compartment when it is related to the direct operation of the gas turbine, for example an oil cooling unit fan, an air conditioning compressor, etc.).

Advantageously and according to this last aspect of the invention, the fuel pump and the oil pump of the gas turbine are electric and powered by electrical energy supplied by the accessory gearbox.

According to this aspect of the invention, the use of electric pumps reduces the mass of the power architecture and facilitates the transmission of energy between the two compartments.

Advantageously and according to the invention, the first electrical machine and the second electrical machine are configured to receive or supply electrical energy to an on-board electrical network of the aircraft.

According to this aspect of the invention, when the first electrical machine is a starter/generator, the first electrical machine can, in starter operation, use electrical energy from the aircraft electrical system to start the gas turbine, and in generator operation, supply electrical energy to the network to power other equipment of the aircraft.

Advantageously and according to the invention, the gas generator comprises a high-pressure turbine directly connected to the free turbine.

In this "linked turbine" type architecture, the shaft of the gas generator and the power shaft are mechanically connected.

Advantageously and according to the invention, the power transmission gearbox comprises transmission elements comprising bevel gears.

According to this aspect of the invention, the transmission elements are configured to adjust the rotational speed of the rotor, even when the power transmission gearbox and the gas turbine are oriented at any angle.

The invention also relates to an aircraft comprising a rotor connected to a rotary wing or propeller, characterized in that the rotor is driven in rotation by a power architecture according to the invention.

Advantageously and according to the invention, the gas turbine is oriented at any angle with respect to the axis of rotation of the rotary wing or propeller.

The invention also concerns a power architecture and an aircraft characterized in combination by all or part of the characteristics mentioned above or below.

LIST OF FIGURES

Figure 2:
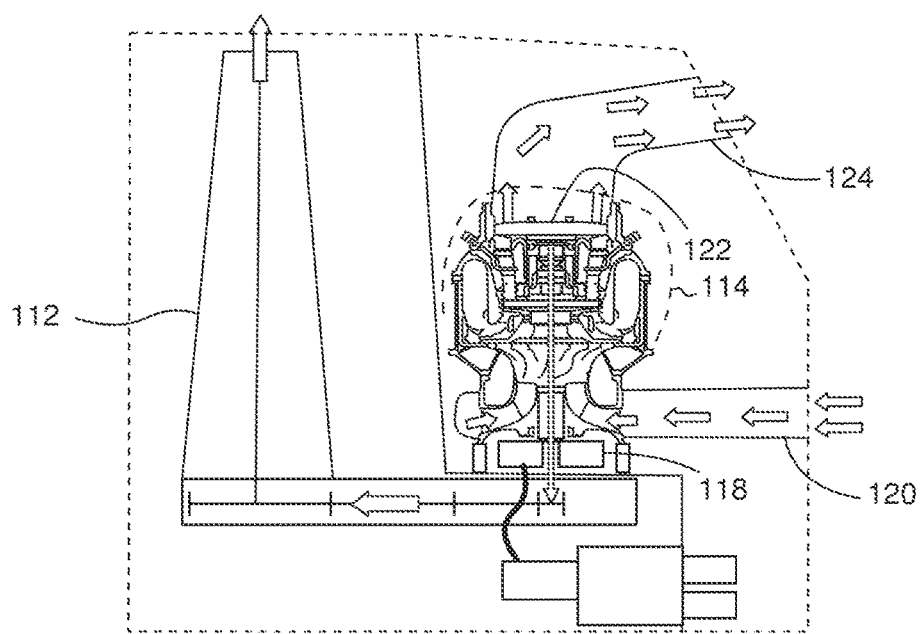
Figure 3:
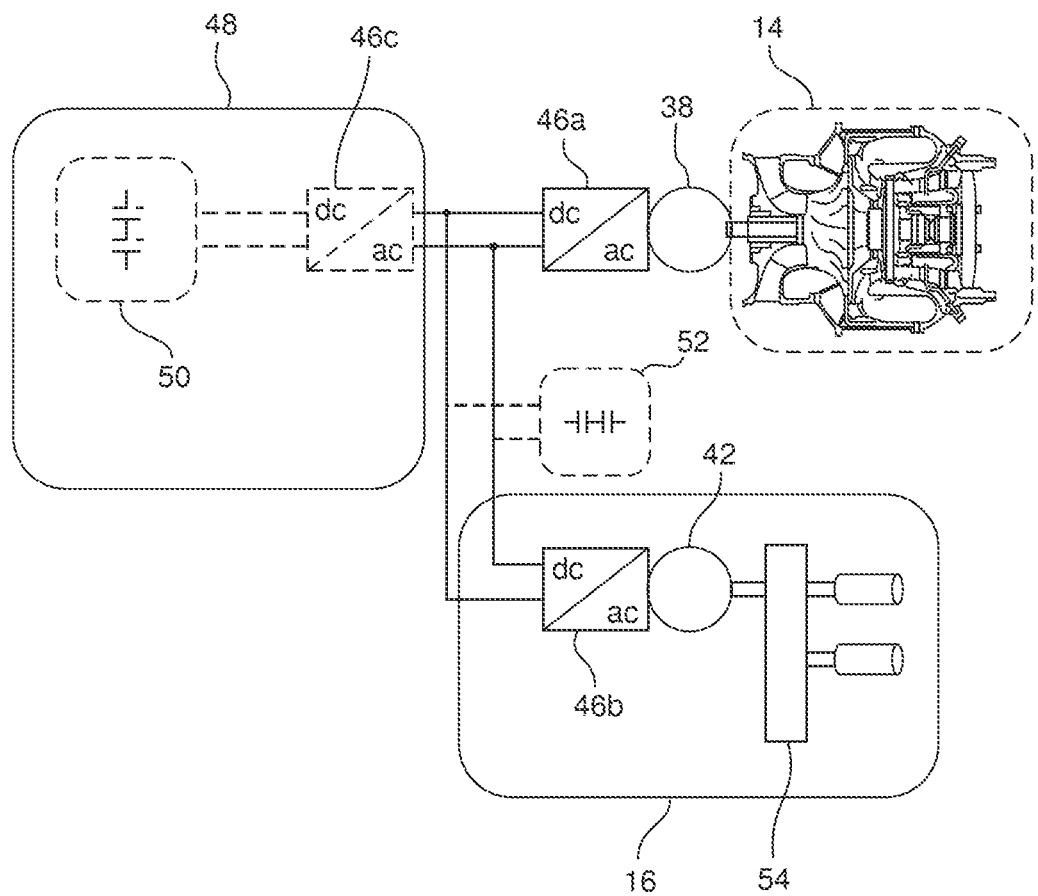

Other purposes, characteristics and advantages of the invention will appear when reading the following description given only in a non-limitative way and which refers to the annexed figures in which:

FIG. 1 is a schematic view in partial section of a power architecture according to a first embodiment of the invention, FIG. 2 is a schematic view in partial section of a power architecture according to a second embodiment of the invention, FIG. 3 is a schematic view of the electrical architecture of a power architecture according to an embodiment of the invention.

DETAILED DESCRIPTION OF AN EMBODIMENT OF THE INVENTION

The following achievements are examples. Although the description refers to one or more embodiments, this does not necessarily mean that each reference concerns the same embodiment, or that the characteristics apply only to one embodiment. Simple characteristics of different embodiments can also be combined to provide other embodiments. On the figures, scales and proportions are not strictly adhered to for purposes of illustration and clarity.

FIG. 1 schematically represents in partial section a power architecture 10 of an aircraft according to a first embodiment of the invention.

The power architecture 10 comprises in particular a power transmission gearbox 12, a gas turbine 14 and an accessory gearbox 16.

The power transmission gearbox 12 allows the transmission of energy generated by the gas turbine to a propulsion element rotating around a rotor 13 driven by the power transmission gearbox 12, for example a rotary wing or a propulsion propeller. When the aircraft is a helicopter, the power transmission gearbox is generally referred to as the main transmission gearbox (abbreviated to MGB).

The gas turbine 14 comprises a gas generator 18, producing in a known way a flow of gas from the compression and combustion of air from an air inlet 20. The gas flow is expanded by a first turbine of the gas generator 18 to allow its own rotation, then in a free turbine 22 of the gas turbine 14. At the free turbine outlet, the exhaust gases are discharged through an exhaust gas outlet 24.

The gas turbine 14 also comprises a power shaft 26 connecting the free turbine 22 to the power transmission gearbox 12 and allowing the power transmission between these two elements. The power transmission gearbox 12 generally comprises a set of transmission elements 28, such as an epicyclic gear train, in particular a planetary reduction gear or a chain of sprockets with conventional external teeth, allowing the rotation speed of the rotor 13 to be adjusted.

According to the relative arrangement of the power transmission gearbox 12 and the gas turbine 14, the transmission elements 28 may also be used to transmit the power, whereas the main transmission gearbox 12 and the gas turbine do not have the same direction of rotation (for example, if they are perpendicular or at any angle). For example, the transmission elements 28 may comprise bevel gears with a concurrent axis.

The power transmission gearbox 12 is located in a first compartment 30 while the gas turbine 14 is located in a second compartment 32, the first compartment 30 and the second compartment 32 being separated by a partition 34. To avoid mechanical problems due to the relative movements of the two compartments, the gas turbine 14 is set in the main transmission gearbox 12, on the one hand via the power shaft, and on the other hand via a holding system 36 directly connecting the gas turbine 14 to the main transmission gearbox 12.

The second compartment 32 is a so-called "hot" compartment because it contains the gas turbine 14, which is a strong source of heat due to the fuel combustion that takes place there. The second compartment 32 is also subject to vibrations and pollution (fuel, oil, etc.) for the same reasons. The first compartment 30 is a so-called "cold" compartment in comparison, since no thermal reaction of such magnitude takes place there.

In the power architecture according to the prior art, the accessory gearbox was fixed directly to the gas turbine and connected to a shaft of the gas generator to take part of the energy it produces, preferably on the air inlet side. In the configuration where the gas turbine is set in the power transmission gearbox, the mass of the accessory gearbox is therefore cantilevered and poses structural and stress problems.

To solve these problems, the accessory gearbox 16 is offset and located in the first compartment. To allow the power supply of accessory equipment 41a, 41b, 41c, it takes energy from the gas generator, not directly as in the prior art, but via a first electrical machine, for example a starter/generator 38, fixed to the shaft of the gas generator and producing the electric energy when the gas turbine 14 is in operation; the electric energy is transmitted via an electric connection 40 to a second electrical machine, for example an electric motor 42, of the accessory gearbox. This electric motor 42 transforms the electrical energy received into mechanical energy that can power the accessory equipment. The accessory gearbox can also directly transmit electrical energy to electrically powered equipment, for example, the fuel pump and oil pump of gas turbine engine, which can be electric.

In the following description, the first electrical machine will be described as a starter/generator, and the second electrical machine will be described as an electric motor. Of course, the first and second electrical machines are not limited to these examples.

The starter/generator 38 can also be used to start the gas turbine 14 when it is switched off or in standby mode. To do this, the starter/generator can be connected to an on-board power supply via an electrical connection, or alternatively to another electrical energy source, such as a battery.

The starter/generator 38 is usually located upstream of the gas generator at the air inlet 20, in particular for thermal stress reasons.

The starter/generator 38 and the electric motor 42 are preferably brushless electrical machines with high rotational speed (over 50,000 rpm). In the prior art, these motors were generally brushless and low rotation speed motors (about 12000 rpm): the use of brushless motors reduces the mass of the starter/generator and the electric motor compared to the prior art. This use of brushless and high speed electrical machines is notably allowed by the use of Mosfet SiC or GaN technologies with very high speed digital cores. The thyristor or IGBTs of the prior art do not have the technological capabilities to drive brushless electrical machines at such high speeds.

FIG. 2 schematically represents a partial cross-section of a power architecture according to a second embodiment of the invention.

In this embodiment, the gas turbine 114 is located in an opposite orientation to the first embodiment: the air inlet 120 and the exhaust gas outlet 124 are reversed, and the free turbine 122 is located at the opposite end of the gas turbine 114 with respect to the main transmission gearbox 112. Thus, to set in the gas turbine 114, the power shaft 126 is said to pass through because it passes through the gas turbine 114 to the main transmission gearbox 112. The first electrical machine, here a starter/generator 138, is always located on the air inlet side. The rest of the operation is similar to the power architecture according to the first embodiment of the invention.

FIG. 3 schematically represents the electrical architecture of a power architecture according to an embodiment of the invention.

As shown in FIGS. 1 and 2, the starter/generator 38 recovers a part of the energy produced by the gas generator of the gas turbine 14. For the transmission of the electrical energy thus produced, the electrical architecture comprises an electrical converter 46a operating in AC/DC (rectifier) mode from the starter/generator 38 to the electrical grid and in DC/AC (inverter) mode from the electrical grid to the starter/generator 38. The electrical network consists of all connections to other connected electrical equipment, in particular to the electric motor 42, which is also connected via an electrical converter 46b (inverter or rectifier), and to the on-board network 48 via an electrical converter 46c of the DC/DC type (chopper). In particular, the chopper can be a bi-directional converter of the resonant and buck boost type. The on-board network 48 comprises an energy storage element 50.

The electric motor 42, which receives electrical energy from the starter/generator 38, can thus supply mechanical energy to ancillary equipment, e.g. via gears 54.

The connection to the on-board power supply 48 is not mandatory in the electrical architecture of the power architecture according to the invention.

According to the embodiments of the invention, the electrical architecture may also comprise a buffer storage 52.

The invention claimed is:

1. An aircraft power architecture, comprising:
    a power transmission gearbox, located in a first compartment, and configured to transmit mechanical energy to a rotor,
    a gas turbine located in a second compartment separated from the first compartment by a partition, comprising a gas generator and a free turbine connected to the power transmission gearbox by a power shaft of the gas turbin,
    an accessory gearbox, configured to supply at least mechanical energy to accessory equipment by taking part of the energy produced by the gas generator, the gas turbine being attached in the aircraft via the power shaft being set in the power transmission gearbox and via a holding system connecting the gas turbine to the power transmission gearbox,
    wherein:
    the gas turbine comprises a first electrical machine configured to take the part of the energy produced by the gas generator and convert it into electrical energy when the gas turbine is running,
    the accessory gearbox is located in the first compartment and comprises a second electrical machine configured to supply power to the accessory equipment and to receive the electrical energy transmitted by the first electrical machine when the gas turbine is running
    wherein the second electric machine receives the electrical energy from the first electric machine via an electric connection and converts the electrical energy to mechanical energy to power the accessory equipment and wherein the accessory gearbox is mechanically decoupled from the gas turbine such that the part of the energy taken from the gas generator by the accessory gear box is transmitted electrically via the first electric machine to the second electrical machine.

2. The power architecture according to claim 1, wherein the rotor supports a rotary wing or a propeller.

3. The power architecture according to claim 1, wherein the first electrical machine is also configured to start the gas generator when the gas turbine is switched off or on standby mode.

4. The power architecture according to claim 1, wherein the first electrical machine and the second electrical machine are brushless electrical machines and configured to operate at a rated speed of more than 50,000 rpm.

5. The power architecture according to claim 1, wherein the accessory equipment comprises a fuel pump and an oil pump of the gas turbine, said pumps being located in the second compartment.

6. The power architecture according to claim 5, wherein the fuel pump and the oil pump of the gas turbine are electric and are powered by an electric energy supplied by the accessory gearbox.

7. The power architecture according to claim 1, wherein the first electrical machine and the second electrical machine are configured to receive or supply the electrical energy to an on-board electrical network of the aircraft.

8. The power architecture according to claim 1, wherein the gas generator comprises a high-pressure turbine directly connected to the free turbine.

9. The power architecture according to claim 1, wherein the power transmission gearbox comprises transmission elements comprising bevel gears.

10. An aircraft, comprising the rotor connected to a rotary wing or a propeller, wherein the rotor is driven in rotation by the power architecture according to claim 1.

11. The aircraft according to claim 10, wherein the gas turbine is oriented at any angle with respect to the axis of rotation of the rotary wing or the propeller.

* * * * *